United States Patent [19]

Koga

[11] Patent Number: 5,424,022

[45] Date of Patent: Jun. 13, 1995

[54] METHOD AND APPARATUS OF INJECTION STRETCH BLOW MOLDING

[75] Inventor: Kouhei Koga, Ueda, Japan

[73] Assignee: Nissei ASB Machine Co., Ltd., Nagano, Japan

[21] Appl. No.: 112,147

[22] Filed: Aug. 26, 1993

[30] Foreign Application Priority Data

Aug. 31, 1992 [JP] Japan ................... 4-255756

[51] Int. Cl.⁶ .................. B29C 49/06; B29C 49/36
[52] U.S. Cl. ...................... 264/532; 264/538; 425/533; 425/534; 425/540
[58] Field of Search ............. 264/532, 537, 538; 425/533, 534, 538, 540

[56] References Cited

U.S. PATENT DOCUMENTS

| 3,453,353 | 7/1969 | Ninneman. | |
| 4,061,705 | 12/1977 | Marcus | 264/537 |
| 4,895,509 | 1/1990 | Giacobbe | 425/534 |

FOREIGN PATENT DOCUMENTS

| 0288581 | 11/1988 | European Pat. Off. |
| 53-22096 | 7/1978 | Japan. |
| 64-3657 | 1/1989 | Japan. |

OTHER PUBLICATIONS

Patent Abstracts of Japan, vol. 6, No. 267 (M-182)(1145) Dec. 25, 1982 & JP-A-57 159 624 (TOSHIBA) Oct. 1, 1982.

Primary Examiner—Catherine Timm
Attorney, Agent, or Firm—Oliff & Berridge

[57] ABSTRACT

An injection stretch blow molding method blow molds a preform into a hollow member while maintaining the preform at a temperature provided by an injection molding step. The method circulatively conveys neck mold support plates each for supporting and conveying a neck mold holding the neck portion of the hollow member or preform through working stations of M in number ($M \geq 3$) including at least injection molding and blow molding stations. The total number N of neck mold support plates is set to be $2 \leq N < M$. The neck mold support plates are conveyed among the working stations other than the injection molding station within an injection molding time T for which an injection molding step is carried out using a neck mold support plate placed in the injection molding station. Before elapse of the injection molding time T, a neck mold support plate, which has ejected the molded hollow member, is caused to wait at a station before the injection molding step. After passage of the injection molding time T, two neck mold support plates resident in the injection molding station and another working station before the injection molding station are simultaneously conveyed to subsequent stations.

12 Claims, 7 Drawing Sheets

METHOD AND APPARATUS OF INJECTION STRETCH BLOW MOLDING

BACKGROUND OF THE INVENTION

1. Field of the Invention

The present invention relates to a hot-parison type injection stretch blow molding method and apparatus, which can continuously perform at least two steps of injection molding a preform (parison) and blow molding the preform into a hollow member through a single stage.

2. Description of the Related Art

One of such one-stage systems is disclosed in Japanese Patent Publication No. Sho 53-22096. This one-stage system comprises a machine base, four injection molding, temperature regulating, blow molding and ejecting stations located in the machine base on each side, and a rotating disc disposed above these working stations for intermittent rotation. The bottom of the rotating disc supports four neck molds, each for holding the neck of a preform or bottle. As the rotating disc is intermittently rotated through every 90 degrees, the four neck molds are circulatively carried in synchronism to the respective working stations. A series of successive steps are performed at the stations for forming a bottle. The time required at the injection molding station is the longest time required at any station. Hence, timing of intermittent rotation is determined according to the time required at the injection molding station. The injection molding time T includes clamping time, injection+cooling time and subsequent mold opening time. The intermittent rotation of the rotating disc is repeated at a time interval substantially equal to such an injection molding time T.

Japanese Patent Publication No. Sho 64-3657 discloses a linear conveyance type injection stretch blow molding system adapted to conveys neck molds along a loop-shaped conveyance path. For example, this linear conveyance type system comprises injection molding, temperature regulating and blow molding stations disposed in a lateral line and an ejecting station arranged in another line. As a preform is being injection molded at the injection molding station, the neck molds are moved between the other working stations in asynchronism with the injection molding cycle.

In the aforementioned systems, each of the neck molds is held by a neck mold support plate, which is circulatively conveyed through respective working stations. The rotary type blow molding machine requires neck mold support plates, which are equal in number to the stations. The linear conveyance type blow molding machine requires a number of neck mold support plates equal to or more than the working stations.

Usually, each of the neck molds used in such a one-stage type of blow molding system is also used as a neck cavity mold, which defines the outer neck wall of the preform in the injection molding station. The cavity mold is expensive since it requires a very high accuracy. Therefore, providing a number of neck molds equal to or more than the number of working stations, as in the prior art, increases the total cost of the molding system. With some types of moldings (vessels), blow molding time and/or temperature regulating time may be reduced or temperature regulating time may be omitted. In such a case, the molding system still requires the same number of neck mold support plates as the number of working stations for circulative conveyance. The neck mold support plate must be stopped unnecessarily in an omitted working station.

SUMMARY OF THE INVENTION

It is therefore an object of the present invention to provide an injection stretch blow molding method and apparatus, which include a number of neck mold support plates less than the total number of working stations, thereby reducing the total cost without degradation of production efficiency.

To this end, the present invention provides an injection stretch blow molding method comprising the steps of injection molding a preform and blow molding the molded preform, while maintaining a temperature provided in the injection molding step, into a hollow member, said injection and blow molding steps being repeated while neck mold support plates supporting and carrying neck molds for holding the neck portions of the hollow members and preforms are circulatively conveyed through working stations of M in number ($M \geq 3$). The working stations include at least injection and blow molding stations. The improvement comprises the steps of providing said neck mold support plates of N in total number ($2 \leq N < M$), conveying the neck mold support plates between the working stations, other than said injection molding station within an injection molding time T, the time in which said injection molding step is performed, causing the neck mold support plate, which has just ejected a molded hollow member, to wait at the working station before said injection molding station until passage of said injection molding time T, and simultaneously conveying at least two neck mold support plates existing in said injection molding station and the working station before the injection molding station to respective subsequent steps after passage of said injection molding time T.

The present invention also provides an injection stretch blow molding apparatus comprising working stations of M in number ($M \geq 3$) including an injection molding station for injection molding a preform and a blow molding station for blow molding the injection molded preform into a hollow member. The apparatus comprises neck mold support plates of N in number ($2 \leq N < M$) for supporting neck molds, which hold neck portions of said hollow members or preforms to be circulatively conveyed through said working stations, and means for conveying the neck mold support plates between the working stations other than said injection molding station within an injection molding time T (in which an injection molding step is performed). The conveying means is adapted to cause the neck mold support plate, which has just ejected the molded hollow member, to wait at the working station until passage of said injection molding time T. The conveying means is also adapted to convey at least two neck mold support plates resident in said injection molding station and another working station before said injection molding station simultaneously to respective subsequent steps after passage of said injection molding time T.

In the method and apparatus of the present invention, the total number N of the neck mold support plates is smaller than the total number M of the working stations. In addition, the neck mold support plates are conveyed through the working stations other than the injection molding station within the injection molding time T, the time required for conducting the injection molding step.

In the working stations other than the injection molding station, the neck mold support plates are moved in asynchronism with the injection molding. For example, a neck mold support plate may complete a series of stations of the molding cycle and eject a molded hollow member. The neck mold support plate is then resident at a working station situated prior to the injection molding station until passage of injection molding time T. Upon passage of the injection molding time T, then neck mold support plates resident in the injection molding station and in the working station before the injection molding station can simultaneously be moved into respective subsequent stations. This method decreases the time for completing an injection molding cycle.

In the apparatus of the present invention, a conveyor conveys neck mold support plates through the working stations other than the injection molding station in asynchronism with the injection molding cycle. The conveyor then simultaneously conveys two neck mold support plates from tile injection molding station and from the other working station before the injection molding station.

With a rotary type blow molding machine, the conveyor is characterized by a drive functioning as a single actuator which is intermittently rotated. The rotary type blow molding machine further comprises a rotating disc rotatably driven by the drive and a connector/disconnector for connecting and disconnecting the rotating disc from each neck mold support plate. When the rotating disc is disconnected from a neck mold support plate resident in the injection molding station during the injection molding cycle, the other neck mold support plates can freely be conveyed by a single drive among the working stations other than the injection molding station.

With a four-station type system comprising injection molding, temperature regulating blow molding and ejecting stations, the total number of neck mold support plates can be two or three.

If the system has two neck mold support plates, one of the two neck mold support plates will be conveyed from the temperature regulating station through the blow molding station to the ejecting station while the other neck mold support plate is in the injection molding station.

If the temperature regulating station is used as a stand-by station, a three-station type molding system can be used in place of a four-station system.

When the four-station type molding system includes three neck mold support plates, it is preferred that the rotating disc is disconnected from a neck mold support plate resident in the temperature regulating station as well as from the plate in the injection molding station. In such a case, only a neck mold support plate resident in the blow molding station can be conveyed to the ejecting station in asynchronism with the other working cycle. This can prolong the temperature regulating time.

With a three-station type molding system, two neck mold support plates are disposed therein. In such a case, the three-station type molding system can substantially have the same function as that of the four-station type molding system by providing the blow molding station with a temperature regulating or ejecting function.

DETAILED DESCRIPTION OF THE PREFERRED EMBODIMENTS

Figure 1A:
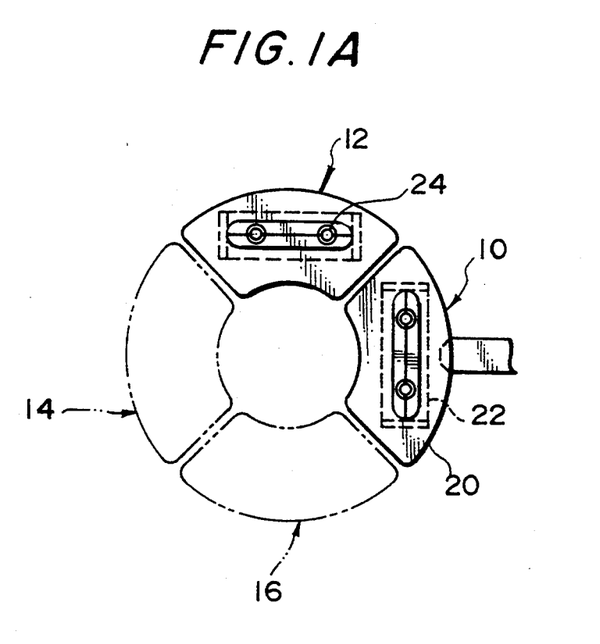
FIGS. 1A–1C are schematic views illustrating an injection stretch blow molding method in accordance with the present invention with two neck mold support plates provided for four working stations.
Figure 1B:
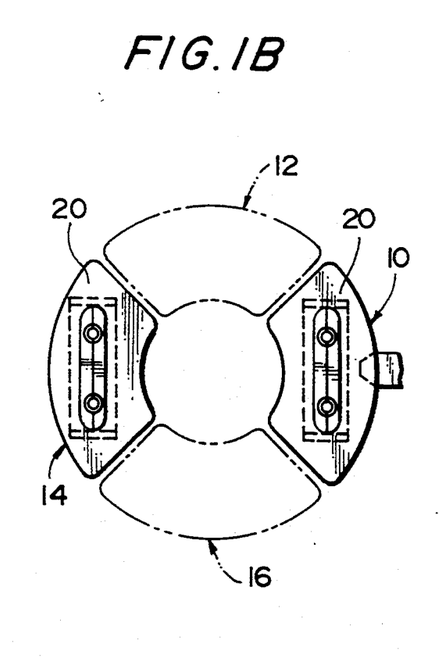
Figure 1C:
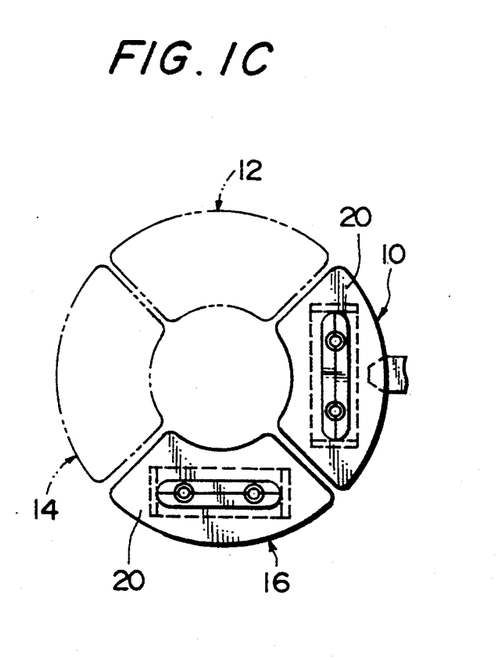

FIGS. 1A–1C show neck mold support plates which are positioned in an injection molding cycle at initial, middle and final stages. The injection stretch blow molding machine comprises four working stations, that is, an injection molding station 10, a temperature regulating station 12, a blow molding station 14 and an ejecting station 16. Two neck mold support plates 22 are provided for these four working stations. Each of the neck mold support plates 22 is supported by a neck mold conveying plate 20, which may be in the form of a sector having a center angle of 90 degrees. Each of the neck mold support plates 22 may hold a plurality of neck molds 24 (e.g. two). Each of these neck molds 24 is formed of two halves which are separatably held by the corresponding one of the neck mold support plates 22. Each of the neck molds 24 functions as a neck cavity mold for a preform in the injection molding station 10. The neck mold 24 also functions as means for conveying a preform from the injection molding station 10 to the blow molding station 14 and as means for conveying a molded bottle from the blow molding station 14 to the ejecting station 16. When the neck mold is opened at the ejecting station 16, the molded bottle can be ejected.

FIG. 1A shows the initial injection molding stage in the injection molding station 10, at which stage two neck mold support plates 22 are positioned in injection molding station 10 and temperature regulating station 12, respectively. The temperature regulating station 12 regulates the temperature of an injection molded preform to a level suitable to stretch it. After the temperature regulating step has terminated, the neck mold support plate 22 is retained in the injection molding station 10 while the neck mold support plate 22 is conveyed from temperature regulating station 12 to the blow molding station 14 (see FIG. 1B).

In other words, the two neck mold support plates 22 are asynchronously operated. At the blow molding station 14, a preform is placed in a blow mold while the neck portion thereof is held by the neck mold 24. The preform is then stretched by a stretching rod along a longitudinal axis and by blown air along the transverse axis to form a biaxially stretched bottle.

FIG. 1C shows the final injection molding stage in injection molding station 10. Only the neck mold support plate 22 is moved from the blow molding station 14 to the ejecting station 16. At the ejecting station 16, the neck mold 24 is opened to eject a molded bottle and is then held at the waiting position until the injection molding step terminates in the injection molding station 10.

Immediately after the injection molding step has terminated in the injection molding station 10, the two neck mold support plates 22 are synchronously returned to the respective positions shown in FIG. 1A. At the injection molding station 10, the injection molding step is re-started to form a new preform. At the temperature regulating station 12, the previously injection molded preform is regulated to a temperature suitable for stretching.

If the injection molding time is set to be T at the injection molding station 10 in the illustrated embodiment, time required to convey one neck mold support plate 22 from the injection molding station 10 no the temperature regulating station 12 and also to place that neck mold support plate 22 at its waiting position in the ejecting station 16 may be controlled within the injection molding time T. The injection molding time T includes time required to clamp the injection cavity mold and injection core mold in the injection molding station 10, to inject a molten plastic material into the cavity, to cool an injection molded preform while holding it in the cavity and finally to open the injection mold.

So long as the time required until the neck mold support plate 22 is placed at its waiting position in the ejecting station 16 is less than time T, dwell time at each of the working stations 12–16 other than the injection molding station 10 may be set at any value. The dwell times at the working stations 12–16 may be set to be equal to each other. Alternatively, a working station requiring the longest operation time may be set to have the longest dwell time.

Since the illustrated embodiment merely requires only two neck mold support plates for flour working stations, the total cost of the neck molds 24 can be reduced to one-half that of the prior art. Further, the injection molding time T will not be increased since the preform temperature regulating step, blow molding step and ejection steps are completed within the injection molding time T in the injection molding station 10.

Figure 2:
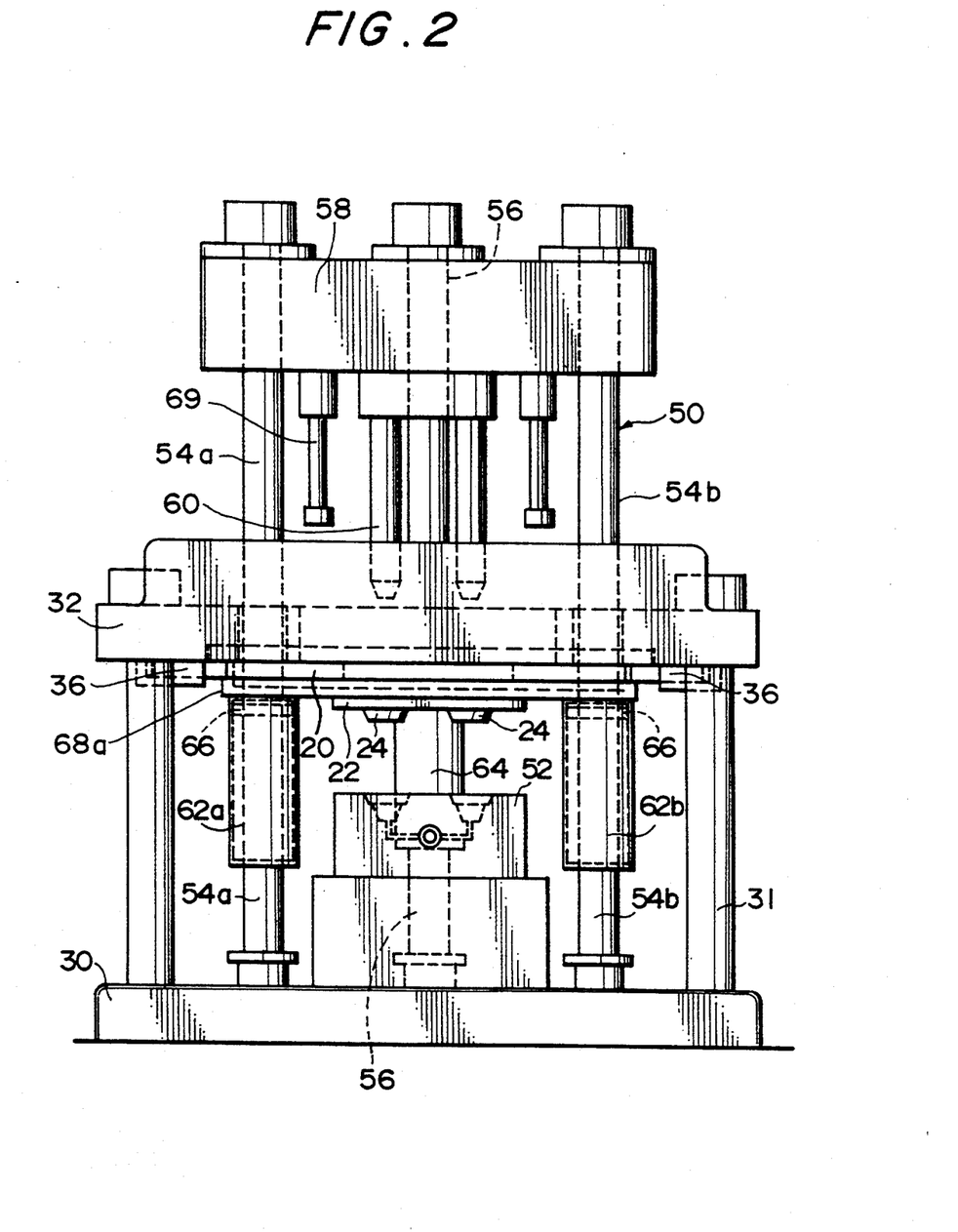
FIG. 2 is a front view of an injection molding station in an injection stretch blow molding apparatus carrying out the method shown in FIGS. 1A–1C.
Figure 3:
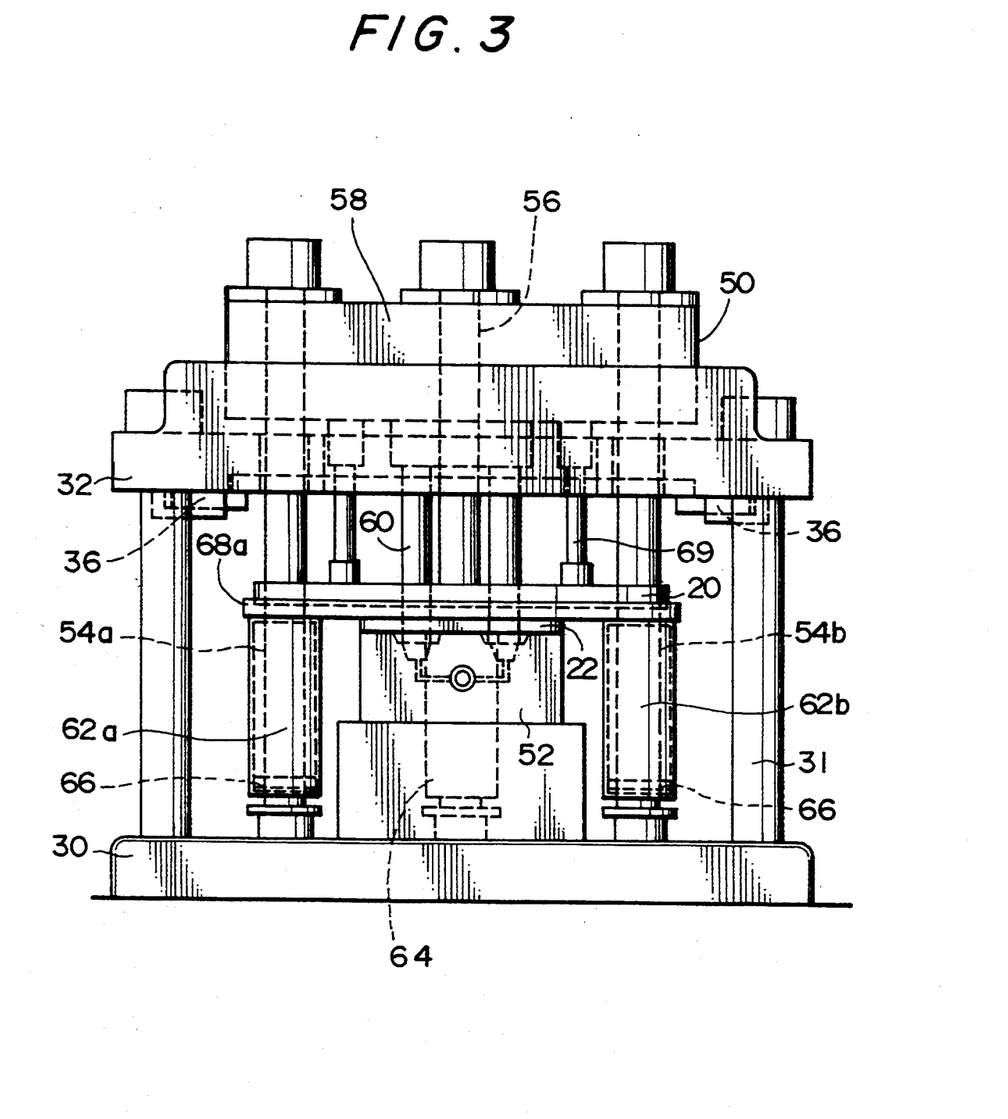
FIG. 3 is a front view similar to FIG. 2, showing the injection molding station in operation.
Figure 4:
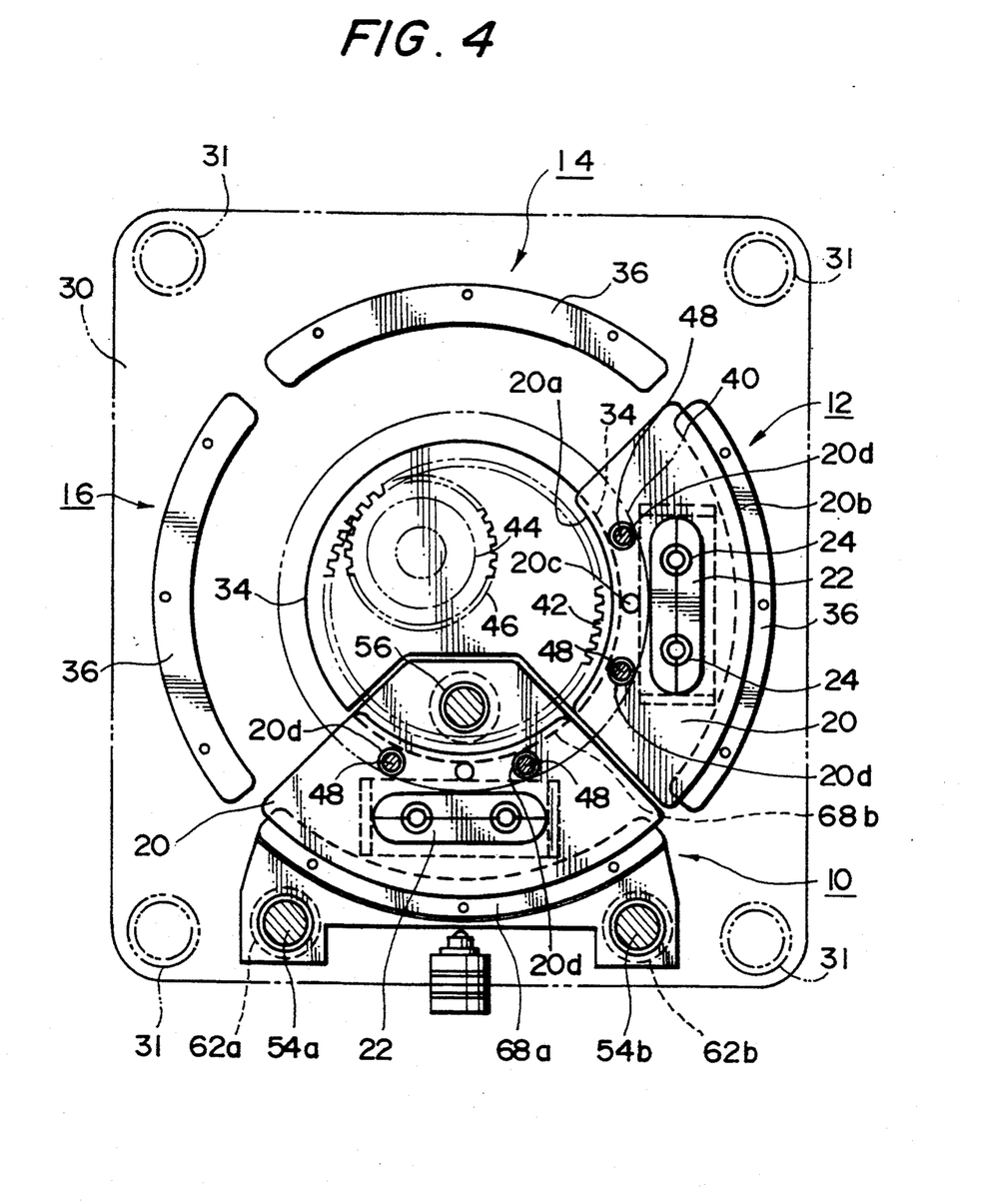
FIG. 4 is a plane view of an injection stretch blow molding apparatus in which the injection molding station of FIG. 2 is mounted.

FIGS. 2–4 show a rotary type blow molding machine for carrying out the method of the present invention shown in FIGS. 1A–1C. The blow molding machine comprises a lower base 30 and an upper base 32 supported by struts 31 above the lower base 30 and spaced parallel away from the lower base 30. At the bottom side of the upper base 32, two neck mold conveying plates 20 are provided. Each of the plates 20 is in the form of a sector having a center angle of 90 degrees, as shown in FIG. 4. An inner guide member 34 for rotatably supporting the inner end 20a of each neck mold conveying plate 20 is disposed to extend between the temperature regulating station 12 and the ejecting station 16 through substantially 270 degrees. An outer guide member 36 for rotatably supporting the outer end 20b of each neck mold conveying plate 20 is disposed along the outer periphery of each of the working stations 12–16 other than the injection molding station 10. The injection molding station 10 further comprises a receiver member 68a for rotatably and vertically movably supporting the outer end 20b of each neck mold conveying plate 20 and a receiver member 68b for similarly supporting the inner end 20 of each neck mold conveying plate 20.

Each of the neck mold conveying plates 20 includes a neck mold support plate 22 that is supported at the bottom thereof. The neck mold support plate 22 may support a plurality of neck molds 24 (e.g. two). Each of the neck molds 24 is formed of two halves, which are separatably supported by the neck mold support plate 22. Each of the neck mold conveying plates 20 includes a positioning hole 20c formed therethrough. After a neck mold conveying plate 20 has been stopped at each of the working station, any suitable drive (not shown), which may be in the form of a drive cylinder, inserts a positioning pin into the positioning hole 20c. The neck mold conveying plate 20 also includes two engagement holes 20d formed therethrough.

The blow molding machine further comprises a mechanism for intermittently rotating the two neck mold conveying plates 20 independently. Such a mechanism includes a rotary disc 40 rotatably mounted above the neck mold conveying plates 20. The rotating disc 40 includes an annular gear wheel 42 formed therein along the inner periphery. The upper base 32 supports a rotary actuator 44 which may be in the form of a hydraulic or electric motor. The output shaft of the rotary actuator 44 fixedly supports a gear 46 engaging with the annular gear wheel 42.

The rotary disc 40 is provided with engagement pins 48, which extend therefrom downward. The working stations other than the injection molding station 10 are located to maintain the neck mold conveying plate 20 at a constant height. When a neck mold conveying plate 20 exists in each of the working stations 12, 14 and 16, the engagement pins 48 usually engage into the engagement holes 20d of the corresponding neck mold conveying plate 20. At each working station other than the injection molding station 10, therefore, the neck mold conveying plate 20 will be rotated therewith when the rotary disc 40 is driven. On the other hand, the injection molding station 10 includes a mechanism for vertically moving a neck mold conveying plate 20, which will be described. When the neck mold conveying plate 20 is in its downward position, the engagement pins 48 of the rotary disc 40 are disengaged from the engagement holes 20d of the neck mold conveying plate 20. In such a situation, therefore, no driving force will be transmitted from the rotary disc 40 to the neck mold conveying plate 20.

The injection molding station 10 further comprises a clamping device 50. The clamping device 50 functions to clamp an injection cavity mold 52 fixedly mounted below the neck molds 24 and an injection core mold 60 located above the neck molds 24 and supported for vertical movement. Three tie-bars are disposed around the injection cavity mold 52 and injection core mold 60. Three movable tie-bars are fixed at their lower ends to the lower base 32, the upper ends thereof extending upward through the upper base 32. More particularly, two movable tie-bars 54a and 54b are located radially outward of the neck mold conveying plate 20 stopped in the injection molding station 10 and on the opposite sides of the center line. The other tie-bar 56 is located radially inward of this neck mold conveying plate 20 on the center line. A clamping plate 58 is fixedly mounted on the top ends of these three tie-bars 54a, 54b and 56. The injection core mold 60 is mounted on the bottom of the clamping plate 58. Pneumatic or hydraulic cylinders 62a, 62b and 64 are slidably fitted over the movable tie-bars 54a, 54b are 56 respectively. These cylinders are disposed below and around the neck mold conveying plate 20. Each of the cylinders 62a, 62b and 64 has a piston ring 66 fixedly connected to the corresponding tie-bar. The top of each of the cylinders 62a, 62b and 64 supports the receiver members 68a and 68b for supporting the neck mold conveying plate 20 for vertical movement.

The receiver member 68a supporting the outer end 20b of the neck mold conveying plate 20 is in the form of a plate spanned between the paired cylinders 62a and 62b. The top face of the receiver member 68a can support the outer end 20b of the neck mold conveying plate 20. The receiver member 68b supporting the inner end 20a of the neck mold conveying plate 20 is in the form of a sector plate having a center angle of 90 degrees. The clamping plate 58 fixedly supports pushdown rods 69 used to move the neck mold conveying plate 20 downaward.

In the illustrated embodiment, as shown in FIG. 2, the neck mold conveying plate 20 is received by the receiver members 68a and 68b in the injection molding station 10 when the rotary disc 40 with the neck mold conveying plates 20 is moved from the position of FIG. 1C through 90 degrees by the rotating actuator 44. Thus, the neck mold 24 will be stopped above the injection cavity mold 52.

A hydraulic pressure is applied to the upper sides of the cylinders 62a, 62b and 64 to move the clamping plate 58 with the movable tie-bars 54a, 54b and 56 downward. Thus, the piston rings 66 are moved downward with the tie-bars. However, the positions of the cylinders 62a, 62b and 64 are maintained with the receiver members 68a and 68b.

As the neck mold 24 and injection core mold 60 begin to clamp, the injection core mold 60 and pushdown rods 69 further urge the neck mold 24 and neck mold conveying plate 20. When the hydraulic pressure is switched from the upper side to the lower side of the cylinders 62a, 62b and 64, the cylinders are downward moved with the movable tie-bars 54a, 54b and 56. The receiver members 68a and 68b also are downward moved while supporting the neck mold conveying plate 20.

On such downward movement, the engagement pins 48 are drawn out of the engagement holes 20d in the rotary disc 40 to separate the neck mold conveying plate 20 from the rotary disc 40. As shown in FIG. 3, thus, the neck mold 24, injection core mold 60 and injection cavity mold 52 are clamped. Thereafter, the molten plastic material is injected into the cavity defined by the respective molds 24, 52 and 60 to initiate a step for injection molding a preform. The injection cavity mold 52 and injection core mold 60 include means for circulating a cooling medium (e.g. water) therethrough. Immediately after the preform has been injection molded in the cavity, the molded preform can begin to be cooled.

In this initial injection molding stage, one of the neck mold conveying plates 20 is located in the temperature regulating station 12 wherein the temperature of the molded preform is regulated to a level for stretching suitable to stretch it. After the temperature regulating step, the other neck mold conveying plate 20 is retained in the injection molding station 10 while only the neck mold conveying plate 20 in the temperature regulating station 12 is moved to a subsequent station, that is, the blow molding station 14. The rotary actuator 44 is rotated by 90 degrees. Driving force is transmitted from the rotary actuator 44 through the gear 46 and gear wheel 42 to the rotary disc 40 and further to only the neck mold conveying plate 20 in the temperature regulating station 12 through the cooperation of the engagement pins 48 and holes 20d. In such a manner, intermittent rotation of 90 degrees is carried out.

Since the engagement pins 48 are separated from the engagement holes 20d of the neck mold conveying plate 20 as described, the rotation will not be transmitted to the neck mold conveying plate 20 in the injection molding station 10. In the injection molding station 10, furthermore, all members in addition to the three movable tie-bars 54a, 54b and 56 are located without interference with the path of the rotary disc 40. Accordingly, only the neck mold conveying plate 20 existing in the temperature regulating station 12 can be rotatably driven in asynchronism with the other neck mold conveying plate 20.

When the preform is conveyed into the blow molding station 14, it can be blow molded and biaxially stretched to form a bottle by the use of a stretching rod along a longitudinal axis and blown air along a transverse axis. On termination of the blow molding step, only the neck mold conveying plate 20 existing in the blow molding station 14 is moved into the subsequent station, that is, the ejecting station 16. This is similarly carried out in the asynchronous manner.

At the ejecting station 16, the neck mold 24 supported by the neck mold support plate 22 is opened by any suitable drive means (not shown) to release the neck of the bottle from the neck mold 24. In such a manner, the bottle is ejected from the neck mold.

When the molded preform has been cooled in the injection molding station 10, the tie-bars 54a, 54b and 56 are upward moved with the clamping plate 58 while maintaining the positions of the cylinders 64a, 64b and 66. After a preselected time period, the cylinders 62a, 62b and 64 are upward moved to open the mold. As a result, the neck mold conveying plate 20 existing in the injection molding station 10 is returned to its original position with the receiver members 68a and 68b. Thus, the engagement pins 48 of the rotary disc 40 are fitted into the engagement holes 20d of the neck mold conveying plate 20 so that the rotary disc 40 can be rotatably driven.

When the rotating actuator 44 is further rotated by 90 degrees, two neck mold conveying plates 20 located at the ejecting and injection molding stations 16, 10 are synchronously conveyed to respective subsequent stations.

The aforementioned embodiment provides a four-station type molding machine, which can mold a hollow member of complicated construction requiring a temperature regulating step, while utilizing a reduce number of neck molds.

The present invention is not limited to the aforementioned embodiment, but may be embodied in various different forms within the scope of the invention.

The present invention may be applied to any three-station type molding apparatus if it includes at least injection and blow molding stations.

For example, the present invention may similarly be applied to a molding apparatus in which the ejection step is carried out in the blow molding station or which includes no temperature regulating station. When it is desired to eject product from the blow molding station, the product may be removed therefrom through any arm means after the mold has been opened at the blow molding station. When it is desired to blow mold a product not requiring any split-type blow cavity mold, for example, a cup-shaped product, the blow molding step may be performed at the temperature regulating station to provide a three-station type molding apparatus. After the temperature regulating step has terminated, for example, the blow cavity mold may be moved upward to clamp it.

Figure 5A:
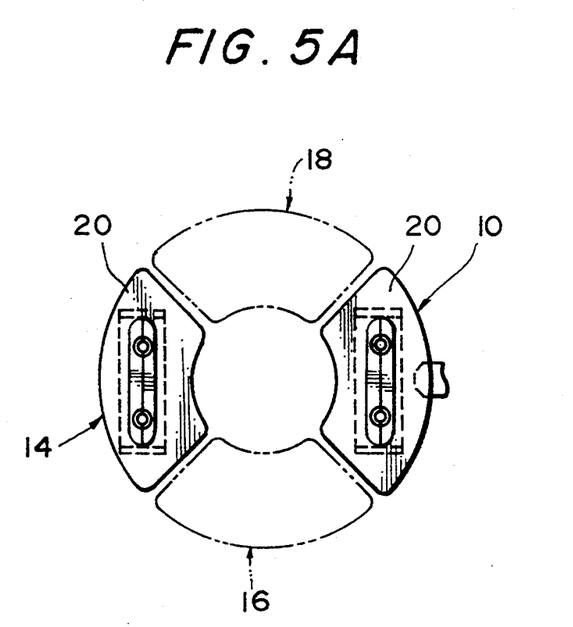
FIGS. 5A–5C are schematic views illustrating an injection stretch blow molding method in accordance with the present invention with two neck mold support plates provided for three working stations.
Figure 5B:
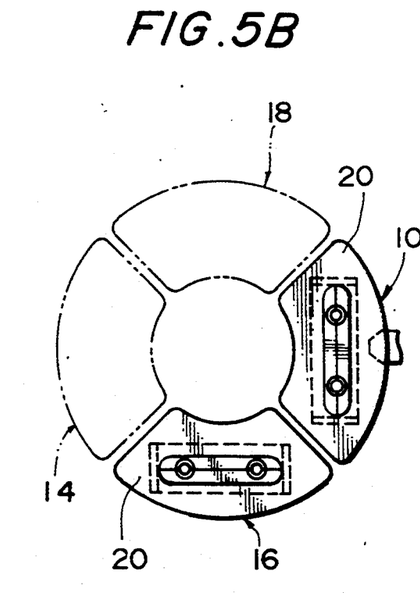
Figure 5C:
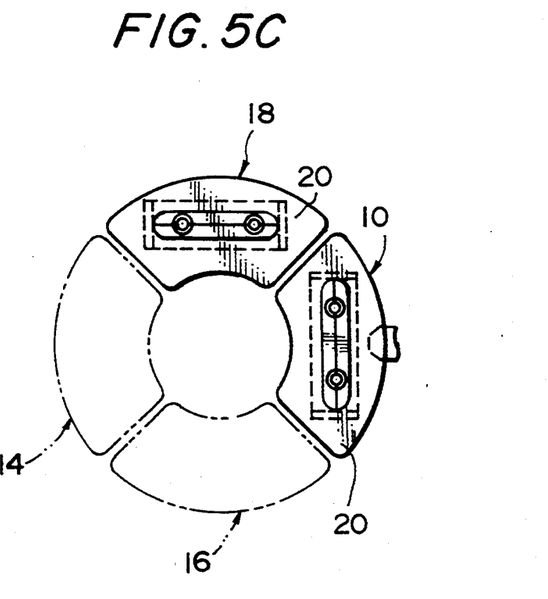

Furthermore, the present invention may be embodied to perform the blow molding operation using only three stations in a blow molding machine which has a space sufficient to dispose four stations. FIGS. 5A-5C show one example of the conveyance operation in such a blow molding machine. FIG. 5A shows an initial injection molding stage in the injection molding station 10, wherein one of the neck mold conveying plates 20 is placed in the injection molding station 10 while the other neck mold support plate 20 is located in the blow molding station 14. The space otherwise occupied by the temperature regulating station is empty station 18. At the middle stage in the blow molding step, the neck mold conveying plate 20 existing in the blow molding station 14 is moved to the ejecting station 16 (see FIG. 5B). On termination of the injection molding step, the neck mold conveying plates 20 resident in the injection molding and ejecting stations 10, 16 are moved through a rotational angle of 90 degrees (see FIG. 5C).

When the neck mold conveying plate 20 in the injection molding station 10 is downward moved as described, a clamping operation is initiated. At the same time, engagement pins 48 are drawn out from the engagement holes 20b. The injection molding station 10 continues to injection mold a preform while rotating actuator 44 is rotated by 90 degrees. The remaining neck mold conveying plate 20 can be conveyed from empty station 18 to blow molding station 14. As a result, the procedure is returned to its original state shown in FIG. 5A and the cycle may be repeated.

The method of the above embodiment may be carried out in a system having four stations 10-16, and also in a system having three stations 10, 14 and 16. Parts required by the temperature regulating station 12 may or may not be mounted in the system. If two neck mold conveying plates 20 are provided for three stations, the molding apparatus is not limited to an arrangement wherein the blow molding station 14 is disposed at a position opposite to the injection molding station 10, as in the aforementioned embodiments. For example, the blow molding station 14 may be disposed at a position adjacent to the injection molding station 10, which is positioned opposite to the empty station 18. In such a case, after the injection molding step, the neck mold conveying plates 20 resident in the injection molding and ejecting stations 10, 16 are moved through a rotational angle of 90 degrees to convey them into the subsequent steps simultaneously. When the blow molding step is terminated in the blow molding station 14 adjacent to the injection molding station 10, the neck mold conveying plate 20 therein is conveyed through a rotational angle of 180 degrees to move into ejecting station 16. When the rotational angle is changed between 90 degrees and 180 degrees on conveyance, it is preferred that the rotary actuator 44 is an electric motor having a rotational ankle, which can optionally be changed. Such an electric motor may be in the form of a servo motor or pulse motor.

Figure 6A:
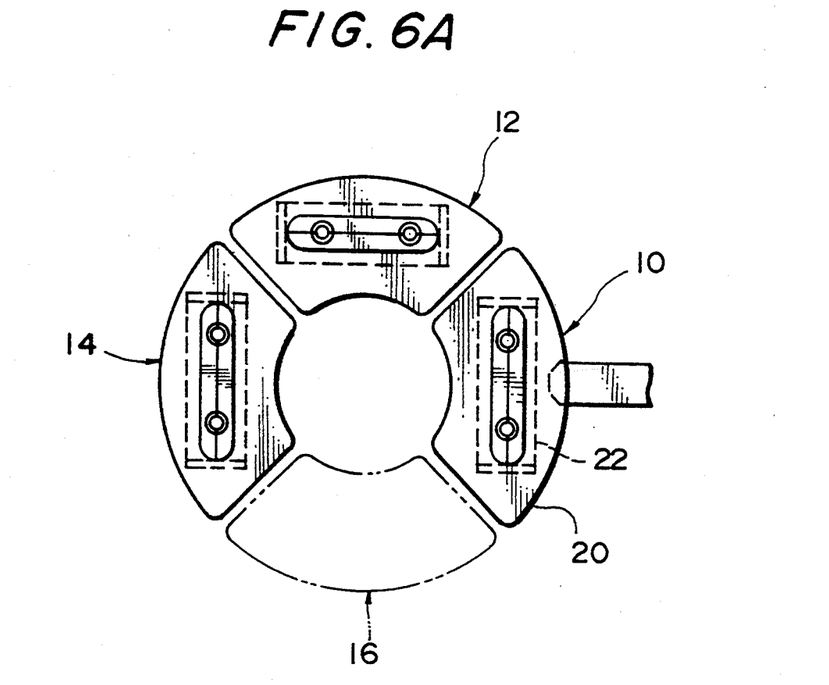
FIGS. 6A and 6B are schematic views illustrating an injection stretch blow molding method in accordance with the present invention with three neck mold support plates provided for four working stations.
Figure 6B:
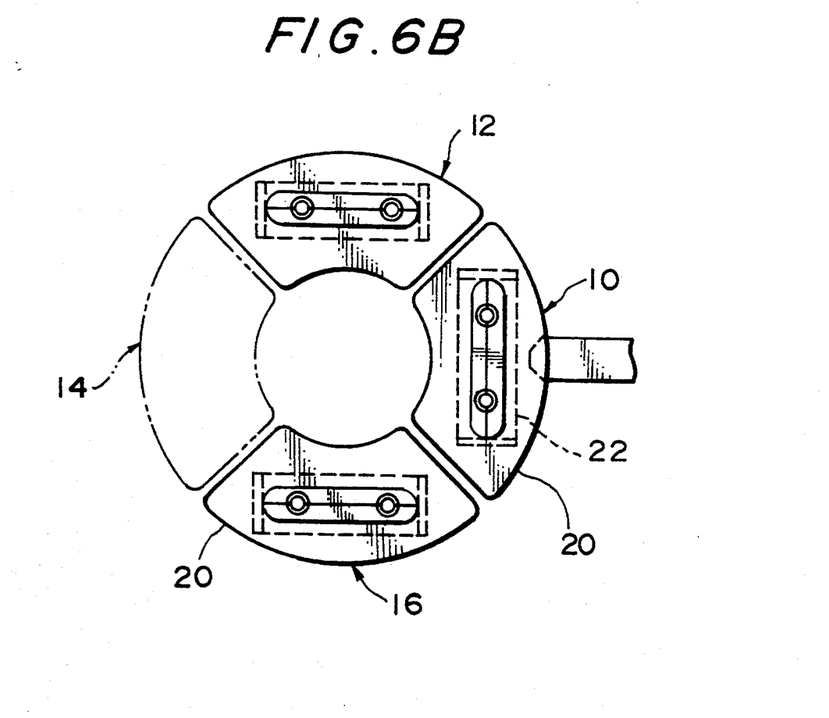

The present invention may similarly be applied to a four-station type molding system in which three neck mold conveying plates 20 are provided for four working stations. This is shown in FIGS. 6A and 6B. FIG. 6A shows three neck mold conveying plates 20 located at dwell positions between initial and middle injection molding stages while FIG. 6B shows the neck mold conveying plates 20 located at dwell positions between middle and final injection molding stages. As shown in FIG. 6B, during the injection molding step in injection molding station 10, only one neck mold conveying plate 20 located in the blow molding station 14 is conveyed to a subsequent or ejection station 16. In such a case, the neck mold conveying plate 20 resident in the temperature regulating station 12 is preferably moved downward to position the preform within a temperature regulating pot positioned below the neck mold 20. On downward movement of the neck mold support plate, the engagement pins 48 may be separated out of the engagement holes 20d to perform the temperature regulating step, as in the injection molding station 10. Since the dwell time at the temperature regulating station 12 can be prolonged in such a manner, the molding system is very suitable to molding bottles which require a relatively long time period in the temperature regulating step.

When the injection molding step is terminated in the injection molding station 10 as shown in FIG. 6B, the rotary actuator 44 is rotated through a rotational angle of 90 degrees such that three neck mold conveying plates 20 located in the injection molding, temperature regulating and ejecting stations 10, 12 and 16 are simultaneously conveyed to subsequent stations. Thus, the system can be returned into its state as shown in FIG. 6A.

Various different conveyance methods may be applied to the four-station type molding system including a method utilizing three neck mold conveying plates 20. In short, the neck mold conveying plates 20 may be conveyed depending on time required by respective working stations.

In a four-station type molding system having three neck mold conveying plates 20, it is preferred that time required to convey one neck mold conveying plate 20 from the injection molding station 10 to a subsequent station and then to cause the same neck mold conveying plate 20 to be placed at its waiting position in a station prior to the injection molding station 10 is set to be equal to or less than $2 \times T$. Generally, when there are N neck mold support plates, one neck mold support plate is conveyed through the series of working stations subsequent to the injection molding station to a station immediately before the injection molding station in a period of time equal to or less than $(N-1) \times T$.

A rotary conveyance type blow molding machine may have eight working stations including first injection molding station, first temperature regulating station, first blow molding station, first ejecting station, second injection molding station, second temperature regulating station, second blow molding station and second ejecting station, all of which are on a path of neck mold support plates driven by a single rotary actuator. In such a case, the present invention may be applied to have neck mold support plates less than the total number $M=8$ of working stations.

Figure 7A:
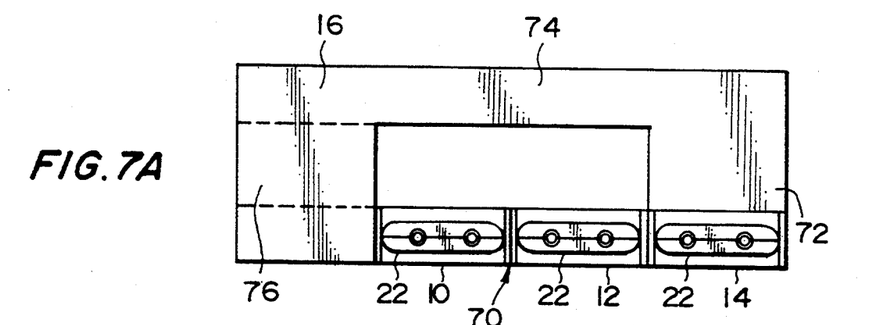
FIGS. 7A–7C are schematic views illustrating an injection stretch blow molding method in accordance with the present invention using a linear conveyance type blow molding machine.
Figure 7B:
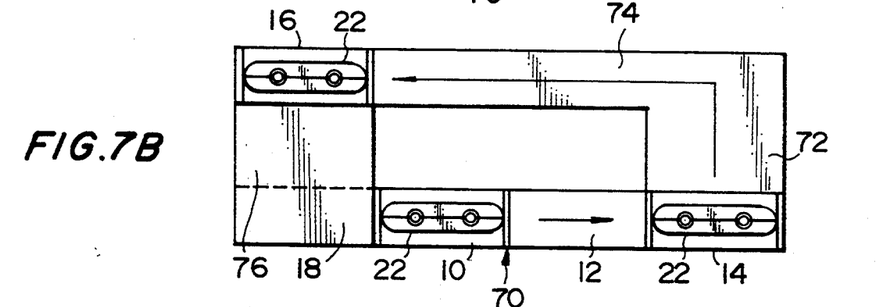
Figure 7C:
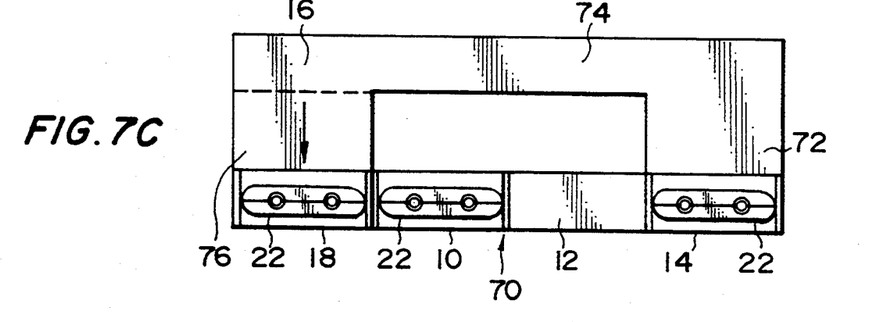

The method of the present invention is not limited to rotary conveyance type blow molding machines as described in the previous embodiments, but may be applied to a linear conveyance type blow molding machine as shown in FIGS. 7A-7C which show the initial, middle and final blow molding stages. In each stage, the neck mold support plates 22 are shown in their dwell position. The embodiment of. FIGS. 7A-7C does not utilize such neck mold conveying plates 20 as in the previous embodiments, but linearly conveys the neck mold support plates 22. The linear conveyance type blow molding machine is of an elongated rectangular configuration with neck mold support plates 22 provided on the sides of first to fourth linear conveyance paths 70-76. The injection molding, temperature regulating and blow molding stations 10, 12 and 14 are disposed in line along one longer side of the rectangular configuration. The third linear conveyance path 74, opposite to the first linear conveyance path 70, includes ejecting station 16 disposed thereon at one end. In the linear conveyance type blow molding system shown only three of neck mold support plates 22 are provided for four working stations 10-16.

In the initial injection molding stage shown in FIG. 7A, the three neck mold support plates 22 are positioned in the injection molding, temperature regulating and blow molding stations 10, 12 and 14, respectively. In the middle injection molding stage, the neck mold support plate 22 located in the temperature regulating station 12 is linearly conveyed to the subsequent or blow molding station 14 while the neck mold support plate 22 resident in blow molding station 14 is linearly conveyed to subsequent or ejecting station 16, as shown in FIG. 7B. Since the ejection step is carried out in the ejecting station 16 for a relatively short time period, the neck mold support plate 22 located in the ejecting station 16 can be conveyed to empty station 18 prior to termination of the injection molding step as shown in FIG. 7C. After the injection molding step has terminated, two neck mold support plates 22 can simultaneously be conveyed from the empty and injection molding stations 18, 10 to respective subsequent stations and the neck mold support plates 22 are positioned at their initial stations shown in FIG. 7A. The linear conveyance type drive method for the neck mold support plates 22 may use any cylinder-piston mechanism disposed on each of the first to fourth linear conveyance paths 70-76 or an endless conveyor means such as endless belts or chains which run along respective linear conveyance paths 70-76. Furthermore, the same linear conveyance type drives may similarly be applied to a circulative conveyance type method comprising two neck mold support plates 22 for three working stations.

I claim:

1. An injection stretch blow molding method wherein a preform or hollow member supported by a neck mold support plate is circulatively conveyed through a series of M number of working stations wherein $M \geq 3$, the working stations including an injection molding station for injection molding the preform and a blow molding station for blowing the preform into a hollow member, the method comprising the steps of:
   (A) supporting a plurality of preforms and hollow members in N number of neck support plates wherein $2 \leq N < M$;
   (B) injection molding one of said preforms supported by one of N number of neck mold support plates resident at the injection molding station in an injection molding time T;
   (C) while injection molding said one preform resident in the injection molding station in time T, conveying $N-1$ number of other neck mold support plates and supported preforms and hollow members through remaining working stations of the series of working stations other than said injection molding station.

2. An injection stretch blow molding method according to claim 1, wherein a neck mold support plate resident in another working station other than said injection molding station is a first neck mold support plate and the one of N number of neck mold support plates resident in the injection molding station is a second neck mold support plate, and further comprising the steps of ejecting a molded hollow member from the first neck mold support plate and delaying residence of the first neck mold support plate in the another working station until passage of injection molding time T.

3. An injection stretch blow molding method according to claim 2, comprising the steps of conveying the second neck mold support plate from the injection molding station to a subsequent station of said series of working stations and simultaneously conveying the first neck mold support plate in the another working station to the injection molding station.

4. An injection strech blow molding method according to claim 1, comprising conveying one neck mold support plate through said series of working station subsequent to said injection molding station to a station immediately before said injection molding station in a period of time equal to or less than $(N-1) \times T$.

5. An injection stretch blow molding method according to claim 1, comprising the steps of:
   providing a rotary conveyance means for conveying the neck mold support plates through said working stations;
   disconnecting the one neck mold support plate resident in said injection molding station from said rotary conveyance means;
   conveying remaining neck mold support plates through the series of subsequent working stations other than said injection molding station while said one neck mold support plate is disconnected from said rotary conveyance means; and
   reconnecting said one neck mold support plate resident in said injection molding station to said rotary conveyance means after completion of the injection molding step.

6. An injection stretch blow molding method according to claim 5, comprising conveying said one neck mold support plate through said series of subsequent working stations after the step of reconnecting the one neck mold support plate to said rotary conveyance means.

7. An injection stretch blow molding method according to claim 6, wherein said series of subsequent working stations comprises a temperature regulating station for regulating temperature for stretching said preform and an ejecting station for ejecting a hollow member from a neck mold, said number of neck mold support plates comprises two neck mold support plates, and wherein a neck mold support plate resident in said ejecting station is a first neck mold support plate and the one neck mold support plate resident in the injection molding station is a second neck mold support plate, and further comprising the steps of:

simultaneously conveying the first neck mold support plate resident in said ejecting station and the second neck mold support plate resident in said injection molding station to respective subsequent stations of said series comprising said injection molding station and said temperature regulating station; and subsequently conveying said second neck mold support plate resident in said temperature regulating station to each of said blow molding and ejecting stations while said first neck mold support plate is resident in said injection molding station.

8. An injection stretch blow molding method according to claim 6, wherein said series of subsequent working stations includes an ejecting station for ejecting a hollow member from a neck mold and a stand-by station for residence of a neck mold support plate prior to conveying to said injection molding station, said number of neck mold support plates comprises two neck mold support plates, wherein a neck mold support plate resident in said ejecting station is a first neck mold support plate and the one neck mold support plate resident in the injection molding station is a second neck mold support plate, and further comprising the steps of:

simultaneously conveying the first neck mold support plate resident in said ejecting station and the second neck mold support plate resident in said injection molding station to respective subsequent stations of said series comprising said injection molding and stand-by stations; and subsequently conveying said second neck mold support plate resident in said stand-by station to each of said blow molding and ejecting stations while said first neck mold support plate is resident in said injection molding station.

9. An injection stretch blow molding method according to claim 6, wherein said series of subsequent working stations comprises three working stations including an ejecting station for ejecting a hollow member from a neck mold and said number of neck mold support plates comprises two neck mold support plates, wherein a neck mold support plate resident in said ejecting station is a first neck mold support plate and the one neck mold support plate resident in the injection molding station is a second neck mold support plate, and further comprising the steps of:

conveying the first neck mold support plate resident in said ejecting station and the second neck mold support plate resident in said injection molding station to respective subsequent stations of said series comprising said injection molding station and blow molding station;

subsequently conveying said second neck mold support plate resident in said blow molding station to said ejecting station while said first neck mold support plate is resident in said injection molding station.

10. An injection stretch blow molding method according to claim 9, further comprising the step of regulating the temperature of a preform to a level for stretching and blow molding the preform into said hollow member.

11. An injection stretch blow molding method according to claim 6, wherein said series of subsequent working stations comprises three working stations including a temperature regulating station for regulating temperature for stretching said preform, said blow molding station comprises an ejector for ejecting a hollow member from a neck mold, said number of neck mold support plates comprises two neck mold support plates and wherein a neck mold support plate resident in said blow molding station is a first neck mold support plate and the one neck mold support plate resident in the injection molding station is a second neck mold support plate, and further comprising the steps of:

ejecting a hollow member from the first neck mold resident in said blow molding station;

subsequently, simultaneously conveying the first neck mold support plate resident in said blow molding station and the second neck mold support plate resident in said injection molding station to respective subsequent stations of said series comprising said injection molding station and said temperature regulating station;

subsequently conveying said second support plate resident in said temperature regulating station to each of said respective subsequent working stations within said injection molding time T while said first neck mold support plate is resident in said injection molding station.

12. An injection stretch blow molding method according to claim 6, wherein said series of subsequent working stations comprises a temperature regulating station for regulating temperature for stretching said preform, said blow molding station and an ejecting station for ejecting a hollow member from a neck mold, said number of neck mold support plates comprises three neck mold support plates, and wherein a neck mold support plate resident in the temperature regulating station is a first neck mold support plate, a neck mold support plate resident in the ejecting station is a second neck mold support plate, and the one support plate resident in the injection molding station is a third neck mold support plate, and further comprising the steps of:

conveying the said, second and third neck mold support plates resident respectively in said temperature regulating, ejecting and injection molding stations to respective subsequent stations of said series comprising blow molding, injection molding and temperature regulating stations;

disconnecting said third neck mold support plate resident in said temperature regulating station from said rotary conveyance means;

conveying said first support plate resident in said blow molding station to said ejecting station while said second and third neck mold support plates are resident in said injection molding and temperature regulating stations;

reconnecting the third neck mold support plate resident at said temperature regulating station subsequent to conducting a temperature regulating step.

* * * * *